(12) United States Patent  
Hansen (10) Patent No.: US 11,982,259 B2  
(45) Date of Patent: May 14, 2024

(54) WIND TURBINE BLADE WITH LIGHTNING PROTECTION SYSTEM

(71) Applicant: LM Wind Power A/S, Kolding (DK)

(72) Inventor: Lars Bo Hansen, Kolding (DK)

(73) Assignee: LM WIND POWER A/S, Kolding (DK)

( * ) Notice: Subject to any disclaimer, the term of this patent is extended or adjusted under 35 U.S.C. 154(b) by 269 days.

(21) Appl. No.: 17/295,261

(22) PCT Filed: Nov. 20, 2019

(86) PCT No.: PCT/EP2019/081919  
§ 371 (c)(1),  
(2) Date: May 19, 2021

(87) PCT Pub. No.: WO2020/104522  
PCT Pub. Date: May 28, 2020

(65) Prior Publication Data  
US 2022/0010783 A1    Jan. 13, 2022

(30) Foreign Application Priority Data  
Nov. 20, 2018 (DK) .......................... PA 2018 70767

(51) Int. Cl.  
*F03D 80/30*    (2016.01)

(52) U.S. Cl.  
CPC .......... *F03D 80/30* (2016.05); *F05B 2240/30* (2013.01); *F05B 2280/2006* (2013.01)

(58) Field of Classification Search  
CPC ..................................................... F03D 80/30  
See application file for complete search history.

(56) References Cited

U.S. PATENT DOCUMENTS 6,979,179 B2 * 12/2005 Møller Larsen ........ F03D 80/30  
                                                                416/223 R  
8,105,035 B2 * 1/2012 Bertelsen ............... H02G 13/80  
                                                                29/897.3

(Continued)

FOREIGN PATENT DOCUMENTS

CN    202431453 U  *  9/2012  
CN    208045713 U     11/2018

(Continued)

OTHER PUBLICATIONS

NPL Carbon Nanotubes and Graphene; University of Michigan Lurie Nanofabrication Facility, "Carbon nanotubes and Graphene", Sep. 12, 2017. (Year: 2017).*

(Continued)

*Primary Examiner* — J. Todd Newton  
*Assistant Examiner* — Wesley Le Fisher  
(74) *Attorney, Agent, or Firm* — Nath, Goldberg & Meyer; Jerald L. Meyer; Tanya E. Harkins (57) ABSTRACT

The invention relates to a wind turbine blade being a shell body made of a composite material and having a root end and a tip end, an outer surface, a pressure side and a suction side, a trailing edge and a leading edge, and additionally a lightning protection system. The lightning protection system comprising at least one lightning receptor provided with an outer surface arranged freely accessible in, on or at the outer surface of the blade at the tip end of the blade and a lightning conductor made of electrically conductive material extending within the shell body along substantially the entire longitudinal direction of the blade. The lightning receptor and the lightning conductor are electrically connected by means of a connection area. At least a part of the outer surface, optionally the whole of the outer surface of the (Continued)

receptor being freely accessible is formed of carbon such as graphite.

16 Claims, 10 Drawing Sheets

(56) References Cited

U.S. PATENT DOCUMENTS

| | | | | |
|---|---|---|---|---|
| 8,459,947 | B2* | 6/2013 | Stege | F03D 1/065 |
| | | | | 416/241 A |
| 8,517,681 | B2* | 8/2013 | Naka | F03D 80/30 |
| | | | | 416/1 |
| 9,660,433 | B2* | 5/2017 | Chung | H02G 13/20 |
| 10,648,456 | B2* | 5/2020 | Shain | F03D 80/30 |
| 2009/0056968 | A1* | 3/2009 | Bertelsen | H02G 13/80 |
| | | | | 290/55 |
| 2011/0020134 | A1* | 1/2011 | Jensen | B82Y 30/00 |
| | | | | 29/889.71 |
| 2011/0142678 | A1* | 6/2011 | Santiago | F03D 1/0675 |
| | | | | 416/241 R |
| 2012/0230832 | A1* | 9/2012 | Stege | F03D 1/065 |
| | | | | 416/228 |
| 2013/0149153 | A1* | 6/2013 | Fujioka | H02G 13/00 |
| | | | | 416/229 R |
| 2015/0364907 | A1* | 12/2015 | Chung | H02G 13/20 |
| | | | | 361/117 |
| 2016/0222945 | A1* | 8/2016 | Shiraishi | F03D 1/0675 |

FOREIGN PATENT DOCUMENTS

| | | | | |
|---|---|---|---|---|
| DE | 102014202951 | A1 * | 8/2015 | ............. F03D 80/30 |
| JP | 2005302399 | A * | 10/2005 | ............. F03D 80/30 |
| JP | 2006052719 | A * | 2/2006 | ............. F03D 80/30 |
| JP | 2016136009 | A | 7/2016 | |
| JP | 2018040280 | A | 3/2018 | |
| KR | 20100115139 | A * | 10/2010 | |

OTHER PUBLICATIONS

English translation of DE102014202951A1 (Year: 2015).*
English translation of JP2005302399A (Year: 2005).*
English translation of CN202431453U (Year: 2012).*
English translation of JP2006052719A (Year: 2006).*
English translation of KR20100115139A (Year: 2010).*
International Search Report issued on Feb. 27, 2020 for application No. PCT/EP2019/081919.

* cited by examiner

WIND TURBINE BLADE WITH LIGHTNING PROTECTION SYSTEM

This is a National Phase Application filed under 35 U.S.C. 371 as a national stage of PCT/EP2019/081919, filed Nov. 20, 2019, an application claiming the benefit of Dutch Application No. PA 2018 70767, filed Nov. 20, 2018, the content of each of which is hereby incorporated by reference in its entirety.

TECHNICAL FIELD

The present invention relates to a wind turbine blade being a shell body made of a composite material and having a root end and a tip end, an outer surface, a pressure side and a suction side, a trailing edge and a leading edge, and additionally a lightning protection system, the lightning protection system comprising:
- at least one lightning receptor having an outer surface arranged freely accessible in, on or at the outer surface of the blade at the tip end of the blade
- a lightning conductor made of electrically conductive material extending within the shell body along substantially the entire longitudinal direction of the blade, and wherein
- the lightning receptor and the lightning conductor (2, 102, 202) are electrically connected by means of a connection area.

BACKGROUND ART

It is known to provide wind turbine blades with lightning protection systems to protect them from lightning strikes. In a known lightning protection system, the tip of the blade is provided with a so-called lightning receptor made of an electrically conductive material. This lightning receptor can "capture" a lightning strike and conduct the current through a lightning conductor, said conductor extending in the longitudinal direction of the blade and being earthed via the rotor hub of the wind turbine. This system has often been shown to provide a satisfactory protection against lightning strikes.

DISCLOSURE OF INVENTION

The object of the invention is to provide a new and improved lightning protection system for wind turbines.

According to the invention this object is obtained by at least a part of the outer surface, optionally the whole of the outer surface of the receptor being freely accessible is formed of carbon such as graphite.

The entire freely accessible outer surface of the receptor can be made of graphite During tests, surprisingly good results have been obtained in relation to protecting blades from lightning strikes and thus preventing damages to the blades by using lightnings receptors with a freely accessible outer surface formed of carbon. Further, a graphite receptor has the advantage over a metal receptor that burrs are not formed when a lightning strikes the receptor as burrs on a receptor generate noise during rotation of the blade.

Preferably, the receptor comprises a graphite cross-sectional area of at least 490 $mm^2$, corresponding to a solid graphite cylinder having a diameter of at least 25 mm, or a graphite cross-sectional area of at least 707 $mm^2$, corresponding to a solid graphite cylinder having a diameter of at least 30 mm, or a graphite cross-sectional area of at least 962 $mm^2$, corresponding to a solid graphite cylinder having a diameter of at least 35 mm, or a graphite cross-sectional area of at least 12567 $mm^2$, corresponding to a solid graphite cylinder having a diameter of at least 40 mm, or a graphite cross-sectional area of at least 1963 $mm^2$, corresponding to a solid graphite cylinder having a diameter of at least 50 mm, or a graphite cross-sectional area of at least 2827 $mm^2$, corresponding to a solid graphite cylinder having a diameter of at least 60 mm.

The lightning receptor can be arranged at the trailing edge, and/or the leading edge and/or the pressure side and/or the suction side and/or on both sides of the blade and/or at the apex of the tip.

According to an embodiment, a graphite layer is arranged on a core of an electrically conductive material, such as a core of metal such as cupper or aluminum.

According to an at present preferred embodiment, the whole receptor is formed of graphite.

Further, according to an embodiment, the receptor extends transversely of the blade from the suction side to the pressure side through or into respective openings in the respective sides, and opposite end faces of the receptor are essentially flush with the outer surface of the respective sides or extend beyond the outer surface of the blade.

Thereby it is advantageously obtained that the blade is optimally protected against harming lightning strikes.

According to an embodiment, the receptor has a cylindrical outer surface comprising a first, upper section and a second lower section having a circular cylindric outer surface, the first upper and second lower section having the same outer diameter.

According to a further embodiment, the receptor has a cylindrical outer surface comprising a first, upper section and a second lower section having a circular cylindric outer surface, the second lower surface having a smaller diameter than the first upper diameter, a shoulder being provide between the first upper and the second lower section.

According to an additional embodiment, the second lower section is provided with an outer thread.

Additionally, according to an embodiment, the connection area between the conductor and the receptor comprises an element, such as a ring-shaped element of an electric conductive material, such as cupper, having an inner cylindrical surface configured to be engaged by the outer surface of the receptor, such as the second lower surface thereof.

Further, according to an embodiment, the conductor is provided with conductive threads and/or wires extending outwardly from the outer surface of the receptor and being anchored in a cavity of the receptor by means of a conductive material or cement, such as a so-called Cu powder cement, and the outwardly extending threads and/or wires are connected to the conductor in the connection area.

Additionally, according to an embodiment, the connection area between the conductor and the receptor is insulated by an insulating material, such as an insulating plastic material such as PUR or epoxy.

According to a further embodiment, a bulkhead is sealingly connected to the shell body in the tip area thereof and the receptor is arranged between the bulkhead and the apex of the tip, optionally the cavity between the bulkhead and the apex of the tip being filled with a plastic material, such as epoxy or a plastic material foam, such as an epoxy foam.

According to an additional embodiment, the receptor is in the connection area between the receptor and the conductor provided with a connection means configured to be releasably connected to a corresponding connection means provided at, on or in the conductor in order to provide a releasable connection between the receptor and the conductor allowing for replacement of the receptor.

The above releasable connection between the receptor and the conductor is according to a further embodiment a thread connection comprising an inner and an outer thread, the connection means of the receptor being the outer thread and the connection means of the conductor being the inner thread, or vice versa.

According to an embodiment where the lightning receptor projects outwardly from the outer surface of the blade, the outer surface of the receptor facing towards the rotation direction of the blade is formed by a protecting wear resistant material on the surface, such as alumina, in order to protect the graphite part of the receptor from being subjected to excessive wear during operation of the blade.

Further according to an embodiment, at least one drain hole is arranged at or in the vicinity of the tip of the blade, and optionally, a diverter extending substantially between the location of the drain hole and the location of the lightning receptor is positioned on the surface of the blade.

Exemplary embodiments of the wind turbine blade according to the present invention is defined in the dependent claims.

BRIEF DESCRIPTION OF THE DRAWINGS

The invention is explained in greater detail below by way of embodiments which are shown in the drawings, in which.

DETAILED DESCRIPTION

Preferably, the invention relates to wind turbines of the type known in the industry as wind turbines according to the Danish concept. Typically, such a wind turbine consists of a tower, a nacelle with gear and generator and a rotor consisting of a hub and three blades, where the rotor shaft is substantially horizontal. Each blade comprises a leading edge and a trailing edge, and a pressure side and a suction side.

Existing lightning protection systems for blades on a wind turbine according to the Danish concept often use a construction where a so-called lightning receptor made of electrically conductive material is provided at the tip of the blade. This is also the case with the blade according to the present invention with lightning protection system. The lightning receptor can "capture" a lightning strike and conduct the current through a lightning conductor, said conductor extending in the longitudinal direction of the blade and being earthed via the hub.

Figure 1A:
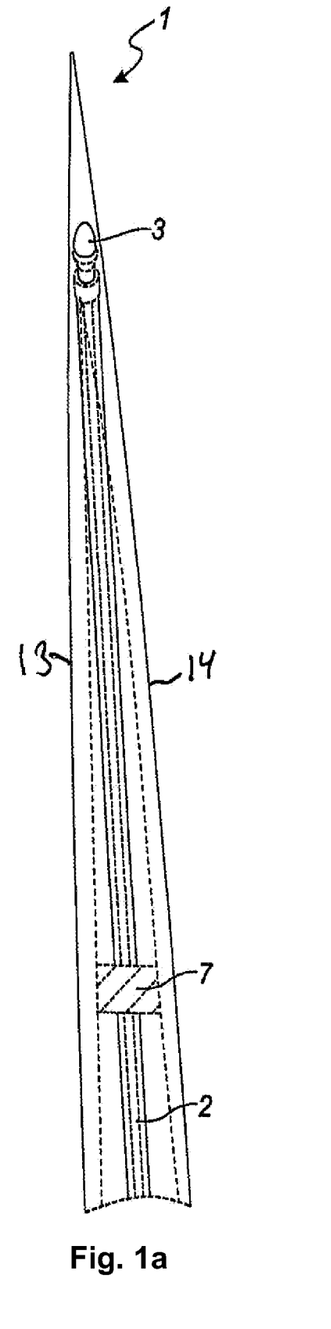
FIG. 1a is a schematic view of a blade according to a first embodiment, seen towards the trailing edge of the blade.
Figure 1B:
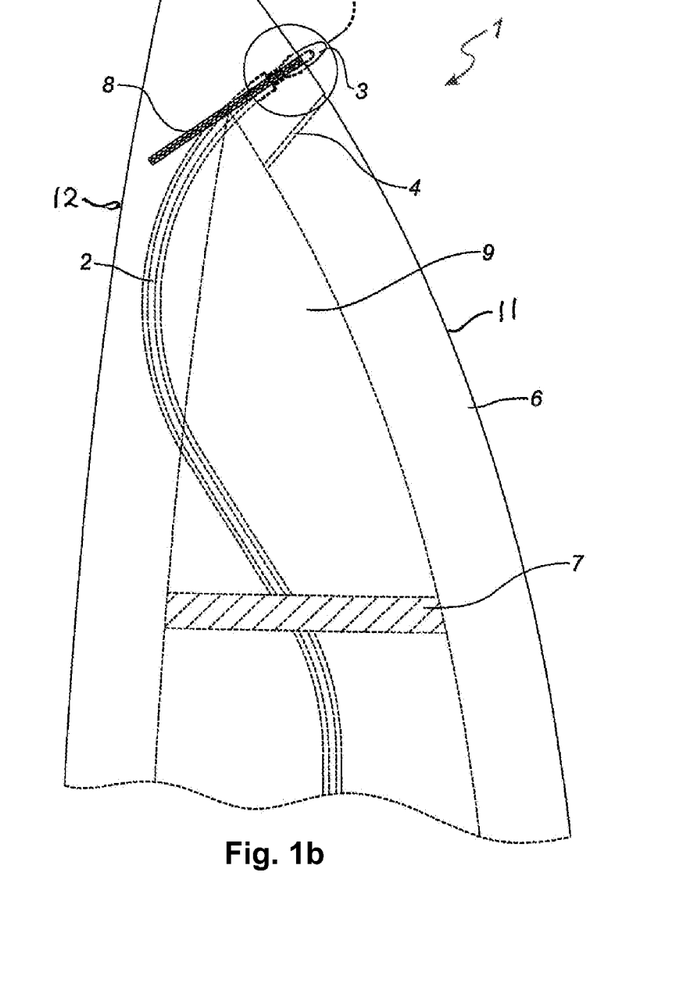
FIG. 1b is a top view of the same blade.
Figure 1C:
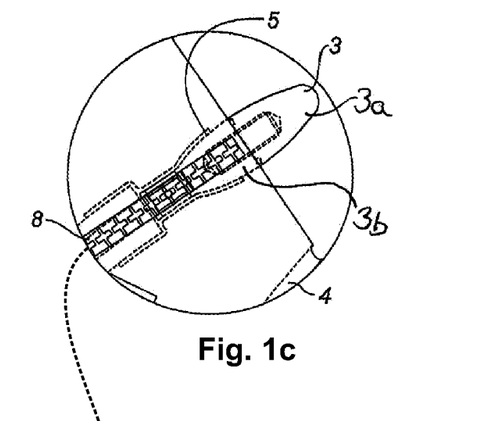
FIG. 1c shows a magnified detail of the blade shown in FIG. 1b.

FIG. 1 shows a first embodiment where a lightning receptor 3 is positioned at the tip end of the blade 1, said lightning receptor preferably, but not necessarily, being predominantly egg-shaped or formed like a so-called Franklin rod. The lightning receptor 3 is connected to a lightning conductor 2 extending substantially in the entire longitudinal direction of the blade 1 from the lightning receptor 3 at the tip of the blade 1 to the root area of the blade 1 at the rotor hub. Preferably, the lightning conductor portion is electrically connected to the hub, and lightning current from lightning striking the lightning receptor 3 can thus be led to earth via the lightning conductor 2 and the hub, said hub being earthed via a second lightning conductor (not shown) connected to an earth rod by means of e.g. the tower and the nacelle. Furthermore, one or more spark gaps may be provided between the lightning conductor 2 and the hub or between the lightning conductor 2 and the tower. The lightning conductors and the earth rod may be copper conductors or may be made of any other electrically conductive material.

The lightning conductor 2 is insulated substantially in its entire longitudinal direction from the root area of the blade 1 to the connection area between the lightning conductor 2 and the lightning receptor 3. The blade 1 is made up of a shell body preferably made of fiber-reinforced polymer so that the blade 1 comprises a laminate shell 6 and a cavity 9 inside the blade 1, respectively. The lightning conductor 2 and the lightning receptor 3 are connected e.g. by means of a threaded connection where the lightning receptor 3 is preferably provided with an inner thread. However, it is also conceivable to provide an embodiment, where the receptor 3 is provided with a connection piece having an outer thread, said connection piece being screwed together with an inner thread of the lightning conductor 2.

A first part 3a of the lightnings receptor extends outwardly from the outer surface of the blade and is freely accessible. In the present example the whole of the receptor 3 is made of graphite, whereby the whole of the freely accessible outer surface of the receptor 3 is formed of graphite. However, a second part 3b of the receptor 3 not being freely accessible could be made of an electrically conductive material such as an electrically conductive metal and being connected to the first part 3a of the receptor 3 made of graphite. Additionally, the metal part 3b of the conductor could extend into the graphite part 3a of the conductor as a core supporting the graphite part 3a of the conductor 3. Further not freely accessible portions of the carbon part 3a of the receptor 3 could be electrolytically or chemically formed metal. As shown in FIG. 1c the outer freely accessible first part 3a of the receptor 3 is connected to the second part 3b by means of a releasable connection, such as a threaded connection.

Thus, it is easy to exchange the portion of the receptor 3 projecting from the surface of the blade 1, if said portion is worn or damaged after a lightning strike.

It should be noted that instead of at the trailing edge 11 the receptor 3 or an receptor of a different design comprising and outer surface made of graphite could be provided at the leading edge 12, the pressure side 14, the suction side 13 or at both sides or at the apex of the tip of the blade.

The lightning conductor 2 shown herein includes a first insulation in the form of a bedding or covering insulation. Additionally, the connection area between the receptor 3 and the lightning conductor 2 is electrically insulated by means of a further insulation 5 in the form of a shrink sleeve. The shrink sleeve 5 extends a short distance into the bedding insulation of the lightning conductor 2 and a short distance into the receptor 3. Thus, the lightning conductor 2 is completely insulated up to the receptor 3.

Furthermore, the blade 1 is provided with a drain hole 4 which also passes through the laminate 6 and which is positioned at the trailing edge of the blade 1. The drain hole 4 is connected to the cavity 9, the latter thus communicating with the environment. In this way, the accumulation of water inside the blade 1 is avoided, since water is emptied from the blade 1 via the drain hole 4 by centrifugal forces during the rotation of the rotor. Simultaneously, the blade 1 may be provided with a filter 7 to collect dust and other dirt, which may be present inside the blade 1 so that these are not thrown towards the drain hole 4 and block it. Preferably, the filter 7 is positioned across the entire cross-section of the cavity 9. By positioning the receptor 3 and the drain hole 4 at the trailing edge of the blade 1, noise arising from the rotation of the rotor is reduced.

Additionally, the surface of the blade 1 is provided with a diverter 8 extending from an area adjacent the receptor 3 at the trailing edge of the blade 1 to an area at the leading edge of the blade 1. This diverter ensures that lightning striking the leading edge of the blade 1, while the blade 1 is in a substantially horizontal position, where the receptor 3 faces downwards, is conducted to the receptor 3 and via the latter to the lightning receptor 2. The diverter 8 may be a continuous strip of electrically conductive material, but may also be segmented, where leaders of ionized air are formed between the individual segments upon a lightning strike, the lightning current thereby being conducted along the diverter 8 in its longitudinal direction.

Figure 2A:
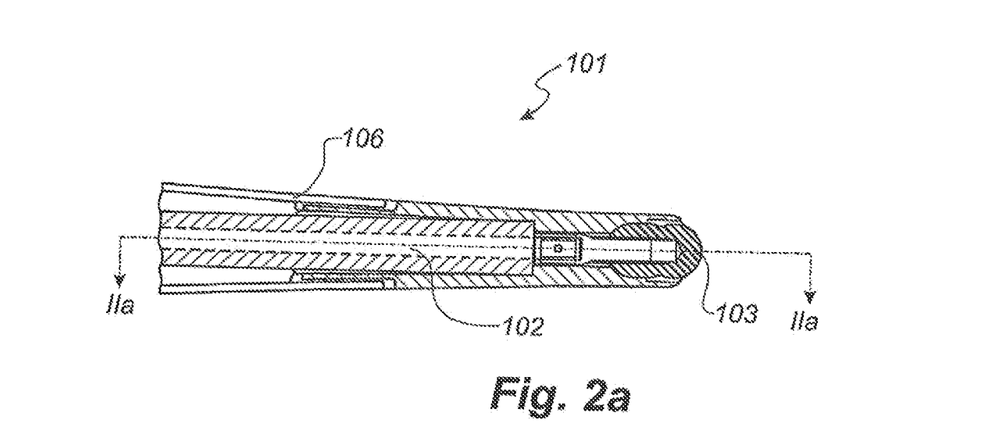
FIG. 2a is a schematic sectional view along the line IIb-IIb in FIG. 2b of a part of a blade according to another embodiment of the invention.
Figure 2B:
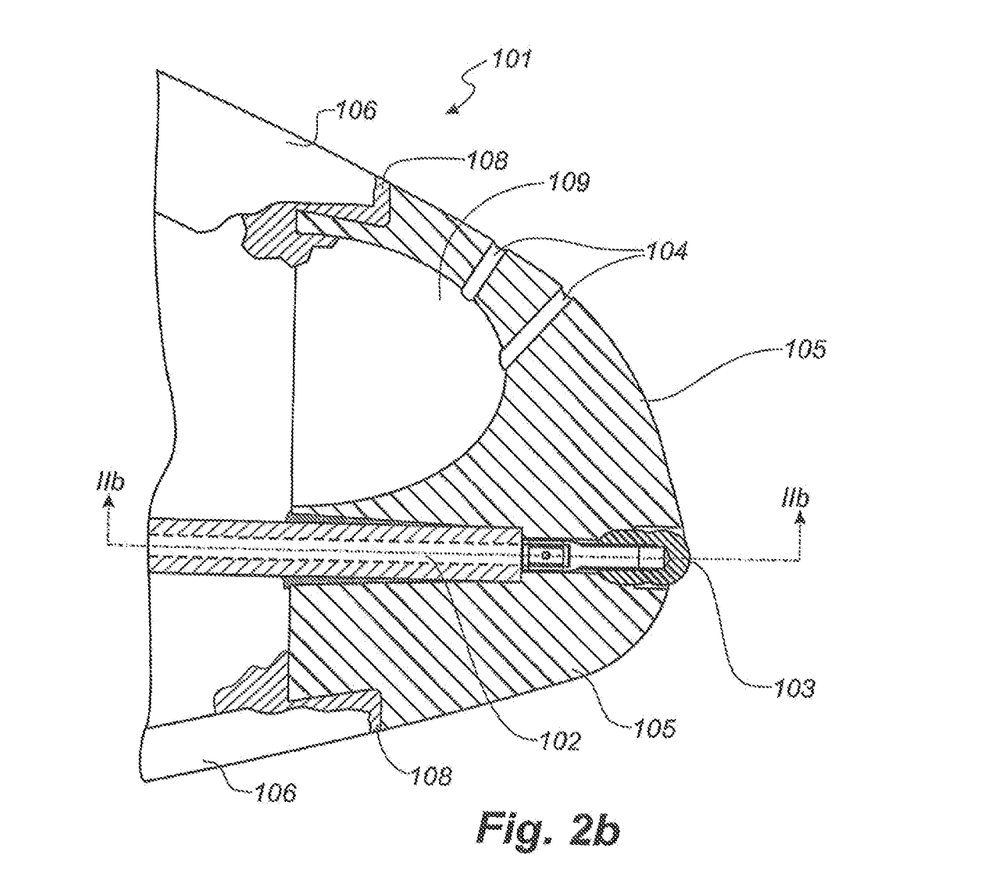
FIG. 2b is a partially sectional view of the same blade along the line IIa-IIa in FIG. 2a, FIG. 3 is a schematic partially sectional top view of a part of a blade according to a third embodiment.

FIG. 2 shows a second embodiment of a blade 101. The blade 101 according to this embodiment has a tip 105 formed as a solid body of e.g. polyurethane, PVC or fiber-reinforced polymer. The rest of the blade 101 is made of a shell body having a laminate shell 106. As in the embodiment shown in FIG. 1, the lightning protection system of the blade includes a lightning conductor 102 extending substantially in the entire longitudinal direction of the blade 101 from the root end at the rotor hub and to the tip end. The lightning conductor 102 is guided out of the cavity of the blade 101 and into a hole created in the tip 105 and matching the lightning conductor 102. The lightning conductor may be glued to this hole. The lightning conductor is connected to a substantially egg-shaped lightning receptor 103. The lightning receptor 103 is positioned at the surface of the tip 105 so that a small portion thereof projects from the surface. At least the outwardly projecting outer surface of the receptor being freely accessible is formed of graphite. The position and the form of the receptor 103 are adapted to match the desired aerodynamic properties of the tip 105 of the blade 101, while simultaneously having a large outer surface of graphite. In the example the tip 105 is a solid tip of graphite. However as described above, it could also comprise two parts, a first readily accessible part comprising an outer surface made of graphite and a second not accessible part comprising metal.

As in the embodiment shown in FIG. 1, the lightning conductor 102 and the receptor 103 are preferably connected by means of a threaded connection, where the connection area between the lightning conductor 102 and the receptor 103 may be electrically insulated by means of an additional insulation in the form of e.g. a shrink sleeve or a layer of silicone. However, the tip 105 may be sufficient to provide the desired electrical insulation. The lightning conductor 102 typically comprises an inner core or inner conductor and an outer insulating covering and optionally an intermediate semi conductive layer.

The tip 105 is provided with a cavity 109 being connected to two drain holes 104 so that the cavity can communicate with the environment via the holes. When the rotor rotates, water having possibly accumulated inside the blade 101 is thus guided to the cavity 109 of the tip 105 and from there out through the drain holes 104 due to centrifugal forces. Preferably, the tip 105 is additionally provided with a diverter extending between an area adjacent the drain holes 104 and an area adjacent the receptor 103 on the surface of the tip 105. Any lightning striking the drain holes 104 is thus conducted via the diverter to the receptor 103 and via the latter to the lightning conductor 102 and finally to earth via the hub, the tower or the like. The tip 105 is fastened to the rest of the blade 101 by means of a glue joint 108.

Figure 3:
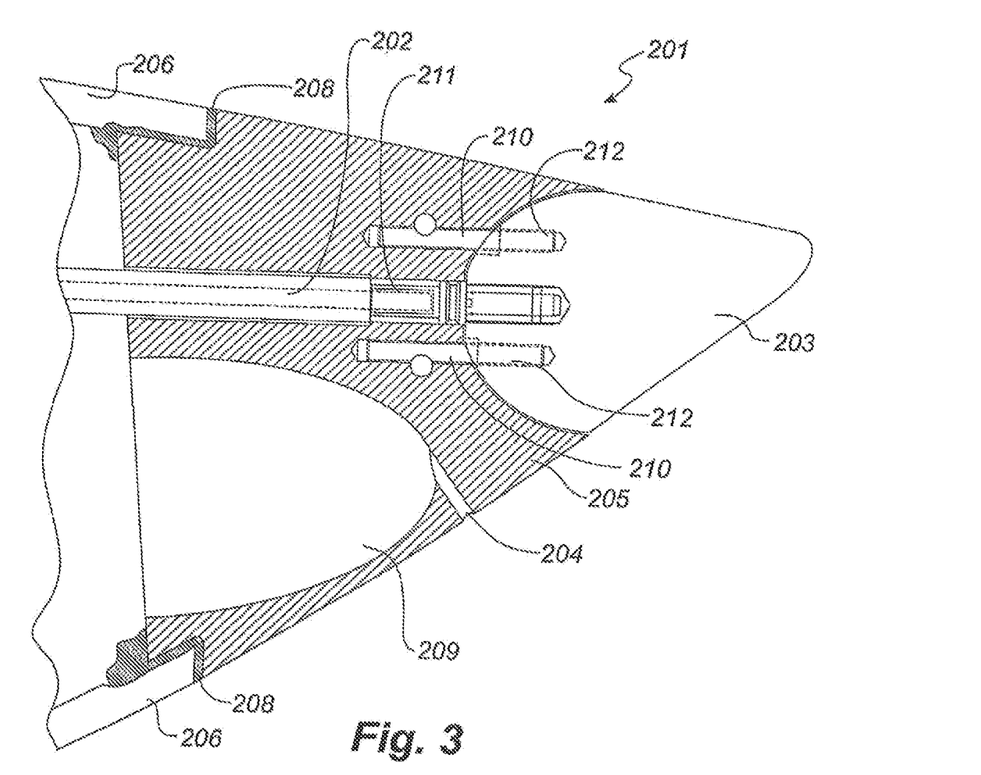

FIG. 3 shows a third embodiment of a blade 201 according to the invention. The blade 201 according to this embodiment has a tip 205 formed as a substantially solid body of e.g. polyurethane, PVC or fiber-reinforced polymer as in the embodiment shown in FIG. 2. The rest of the blade 201 is made of a shell body having a laminate shell 206. As in the embodiments shown in FIG. 1 and FIG. 2, the lightning protection system of the blade 201 includes a lightning conductor 202 extending substantially in the entire longitudinal direction of the blade 201 from the root end at the rotor hub and to the tip end. The lightning conductor 202 is guided out of the cavity of the blade 201 and into a hole created in the tip 205 and fitting the shape of the lightning conductor 202.

The lightning conductor 202 is connected to a lightning receptor 203 having a rounded shape and positioned at the apex of the tip 205. The lightning receptor 203 is a solid body made of graphite and is configured to provide a substantially smooth transition between the tip 205 and the receptor 203 and so that it has the desired aerodynamic properties of the tip 201. In other words, the receptor 203 according to this embodiment is a part of the tip of the blade 201.

As in the embodiments shown in FIG. 1 and FIG. 2, the lightning conductor 202 and the receptor 203 are connected by means of a threaded connection 211. Moreover, the lightning conductor is anchored to the tip 205 by means of two plastic rods 210 with outer thread and two threaded holes in the receptor 203. The connection area between the lightning conductor 202 and the receptor 203 is electrically insulated by means of a further insulation in the form of e.g. a shrink material or a layer of silicone. However, the solid tip 205 may be sufficient to provide the desired electrical insulation.

The receptor 203 can at the leading edge thereof, i.e. the portion of the receptor facing in the rotational direction of the blade during operation thereof, be provided with a not shown layer of wear resistant material in order to prevent excessive wear of the receptor.

Figure 4A:
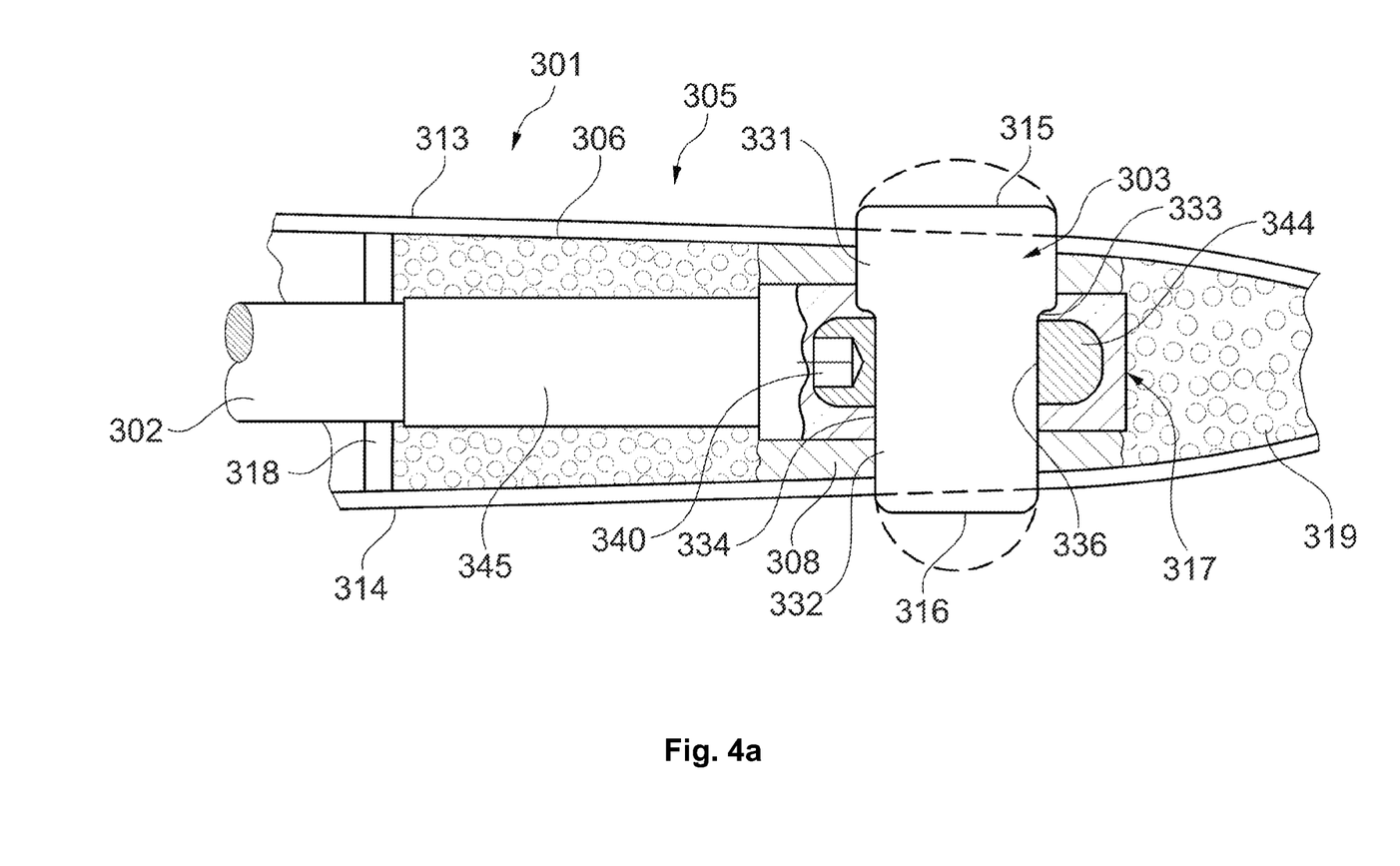
FIG. 4a is a diagrammatically longitudinal sectional view through the tip of a blade according to a fourth embodiment of the invention.
Figure 4B:
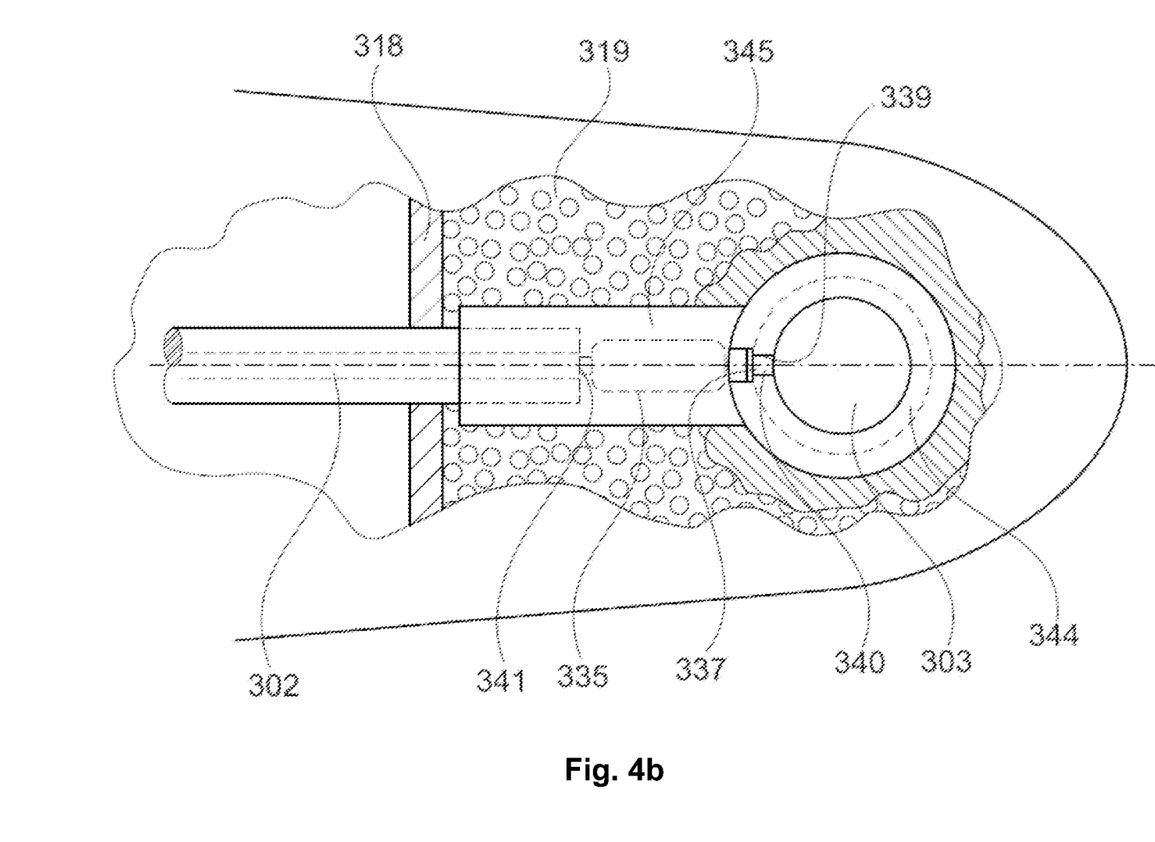
FIG. 4b is a diagrammatical longitudinal partly sectional view through the tip of a blade, essentially perpendicular to the view in FIG. 4a FIG. 5a is a diagrammatically longitudinal sectional view through the tip of a blade according to a fifth embodiment of the invention.

FIG. 4 discloses a forth embodiment of a blade 301 according to the invention. The blade 301 comprises a laminate shell 306 and as described in relation to FIG. 1 to FIG. 3 a lightning protection system including a lightning conductor 302 extending substantially in the entire longitudinal direction of the blade 301 from the root and to the tip 305 of the blade. The lightning conductor 302 extends through bulkhead 318 sealingly connected to the shell of the blade and is at the tip 305 connected to a receptor 303, being a solid body of graphite, by means of a connection device 317. The receptor 303 extends transversely to the blade from the suction side 313 to the pressure side 314 and the opposite end portions thereof extends outwardly from the outer surface of the suction side and the pressure side of the blade, respectively. The outwardly extending opposite end portions 315, 316 can have rounded end faces as shown by dotted lines. The receptor 302 is a cylindrical body having a first or upper cylindrical section 331 and a second or lower cylindrical section 332. In the embodiment shown, the second or lower section has a smaller diameter than the second or upper section, whereby a shoulder 333 is formed between the upper and lower section. The outer surface of the second or lower section 332 is formed by an outer thread 334. However, it should be noted that the second or lower section could have the same outer diameter as the first or upper diameter and be formed by an outer thread. The connection device 317 comprises a ring-shaped element 344 of a conductive material, such as copper or a copper alloy, and being provided with an inner thread 336 corresponding to the outer thread 334 of the receptor 303. The outer thread of the receptor engages the inner thread of the ring-shaped element, thereby providing a releasable connection between the conductor and the receptor and allowing for replacement of a damaged receptor. A first end 337 of a cable connector 335 is provided with an outer thread being in engagement with an inner thread 339 in a hole 340 in the peripheral face of the ring-shaped element 335. An opposite second end 338 of the cable connector 335 is connected with the outer end of the core 341 of the conductor 302. The outer surfaces of the connection area between the conductor and the receptor are covered by a plastic insulation 345 of e.g. an insulation of PUR. Alternatively, or in addition to the insulating PUR covering the connection area between the conductor and the receptor, the cavity between the bulkhead 318 and the apex of the tip could be filled with a plastic material 3019, such as epoxy or a plastic foam such as an epoxy foam, in order to insulate the connection area between the conductor and the receptor. The plastic material can also prevent water from entering the cavity. The connection device and the receptor are glued to the inner surface of the laminate shell 306 by a glue joint 308. Portions of the receptor 303 not being freely accessible can be made of metal, whereas the outer surface of the receptor being freely accessible is formed by graphite.

Figure 5A:
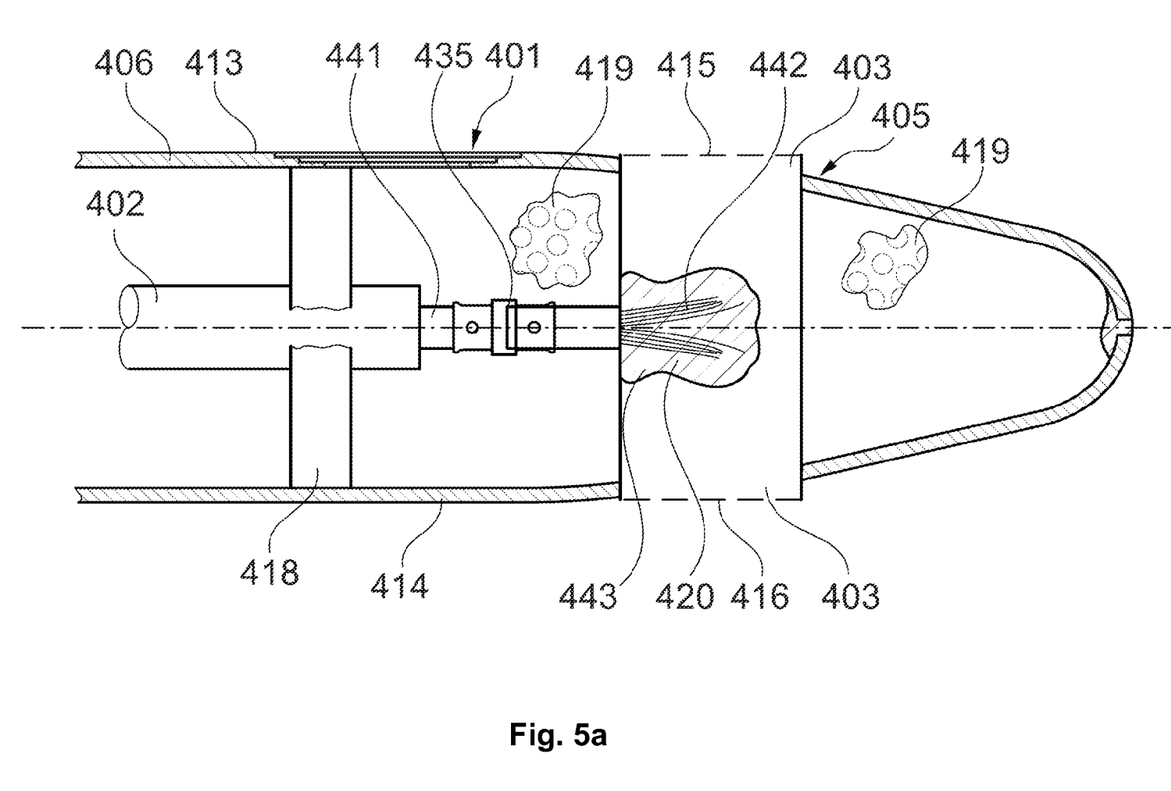
Figure 5B:
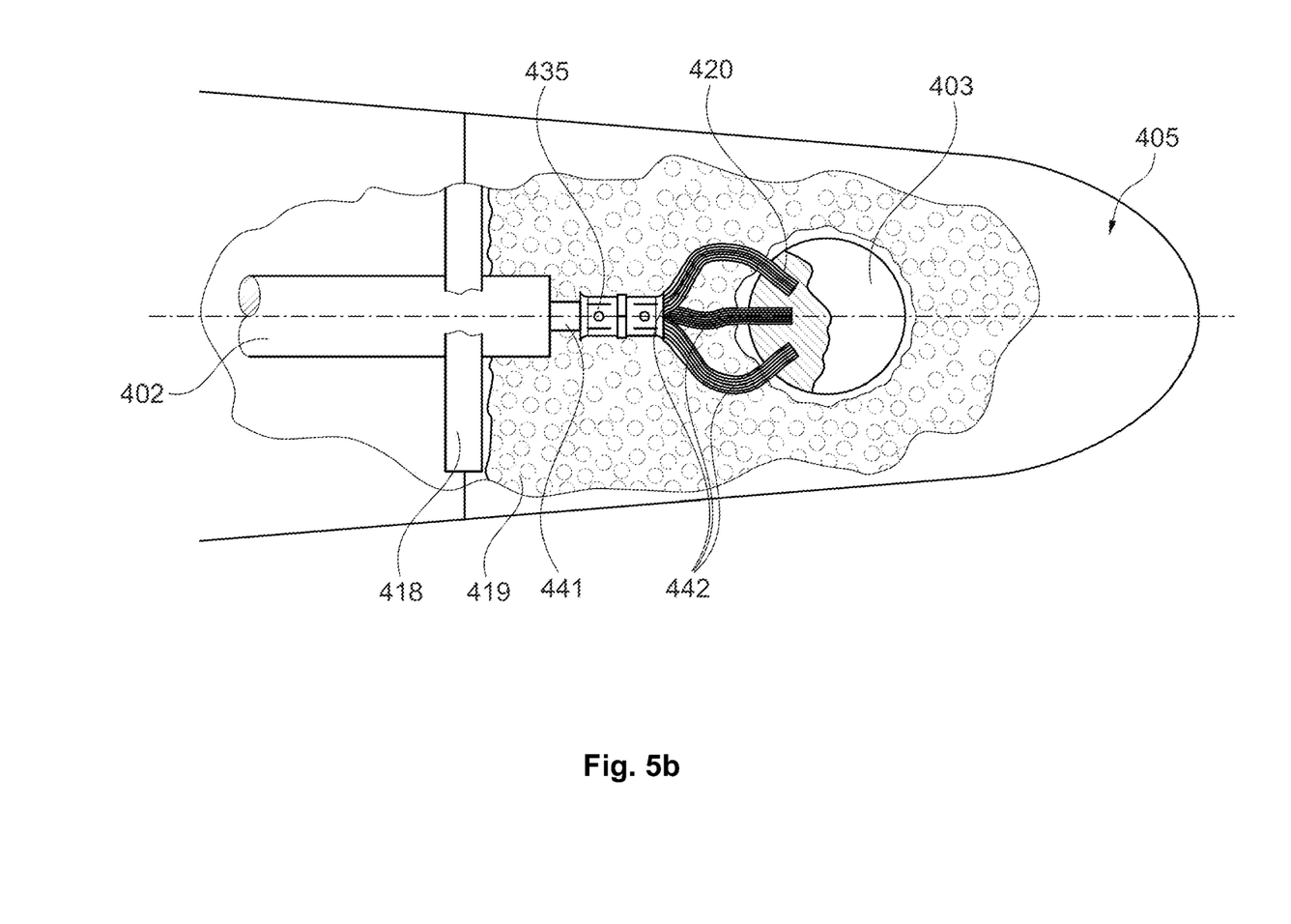
FIG. 5b is a diagrammatical longitudinal partly sectional view through the tip of a blade, essentially perpendicular to the view in FIG. 5a FIG. 6 is a diagrammatically longitudinal sectional view through the tip of a blade according to a sixth embodiment.

FIG. 5 discloses a fifth embodiment of a blade 401 according to the invention. The blade 401 comprises a laminate shell 406 formed by two mutually connected half shells and as described in relation to previously described embodiments a lightning protection system including a lightning conductor 402 extending substantially in the entire longitudinal direction of the blade 401 from the root and to the tip 405 of the blade. The lightning conductor extends through bulkhead 418, preferably made of a plastic material such as a foam material, in the tip 405 and is at the distal side of the bulkhead connected to a receptor 403, being a solid body of graphite. The receptor 403 is a cylindrical body and is provided with conductive threads and/or wires 442 extending outwardly from the outer cylindrical surface of the receptor 403 and being anchored in a cavity 443 of the receptor by means of a conductive material or cement 420, such as a so-called Cu powder cement. The outwardly extending threads and/or wires 442 are connected to the conductor in the connection area, the outwardly extending threads or wires being connected to a first end of a cable connector 435 and the second opposite end of the cable connector 435 being connected to the outer free end of the conductor core 441. The receptor extends transversely of the blade from the suction side 413 to the pressure side 414 and opposite end portions 415, 416 thereof extends outwardly from the outer surface of the suction side and the pressure side of the blade, respectively.

A cavity formed between the bulkhead and the apex of the blade is filled with a plastic material 419, such as epoxy, or a plastic foam, such as an epoxy foam, in order to insulate the conductor and the threads and wires thereof and keep the different parts in place. The foam can also prevent water from entering the cavity.

Portions of the receptor 403 not being freely accessible can be made of metal, whereas the outer surface of the receptor being freely accessible is formed by, graphite.

Figure 6:
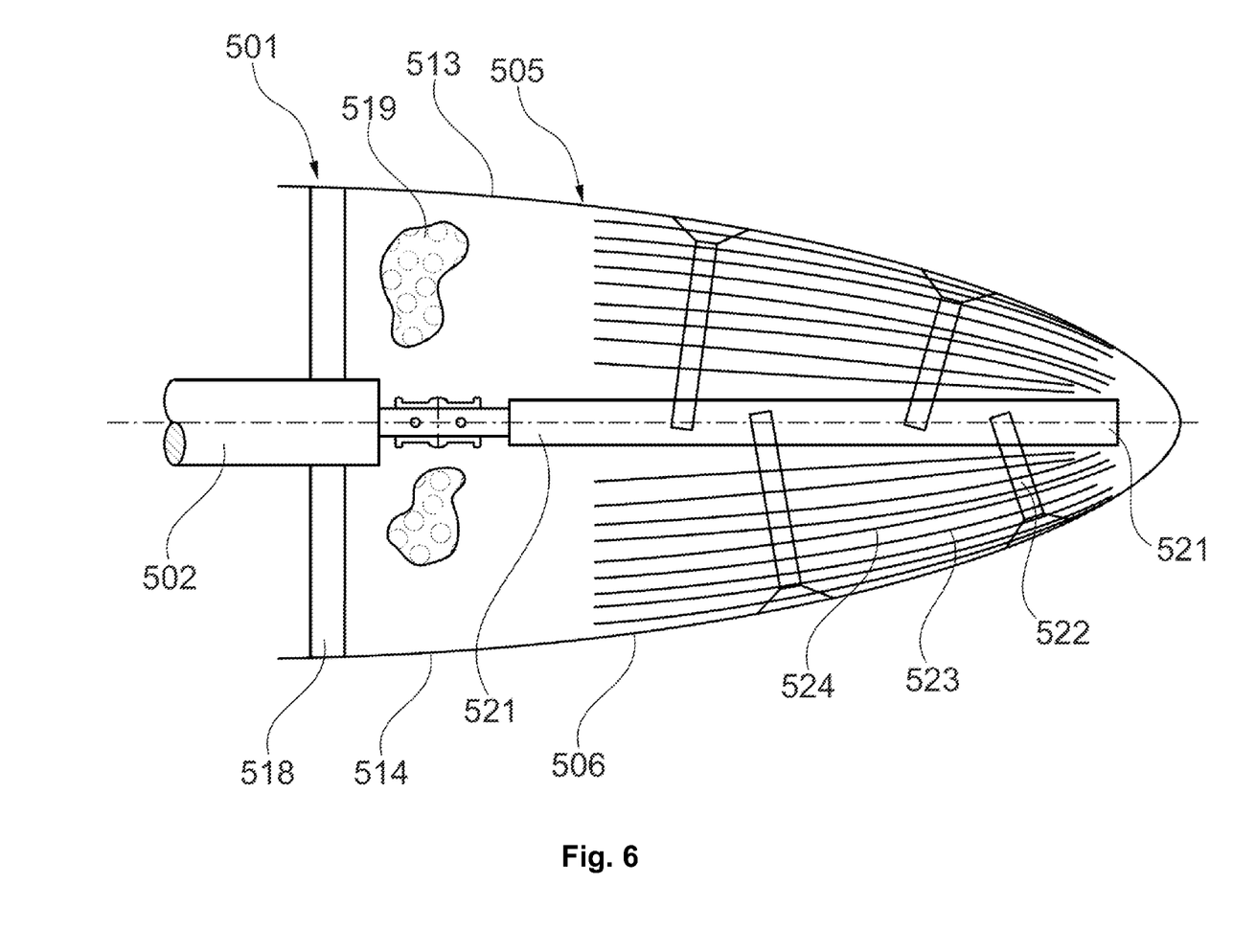

FIG. 6 discloses a sixth embodiment of a blade according to the invention. The blade 501 comprises a laminate shell 506 having a suction side 513 and a pressure side 514 and being formed by two mutually connected half shells and as described in relation to previously described embodiments a lightning protection system including a lightning conductor 502 extending substantially in the entire longitudinal direction of the blade 501 from the root and to the tip 505 of the blade. The lightning conductor 502 extends through a bulkhead 518, preferably made of a plastic material such as a foam material, in the tip 505 and is at the distal side of the bulkhead 518 connected to a conductive plate 521, such as a metal plate. The laminate shell comprises in the tip carbon plies 523, preferably biax carbon plies, and metal mesh plies 524, such as Cu mesh plies. The Cu mesh/biax carbon plies are connected to the plate 521 by means of electrical conductive rods 522, such as metal bolts with countersunk heads, one end of said rods being connected to the plate 521 and the opposite end extending up to the outer surface of the tip on the pressure side and the suction side of the tip of the blade. Thereby the distal portion of the tip of the blade forms a receptor 503.

A cavity formed between the bulkhead and the apex of the blade is filled with a plastic material 519, preferably a plastic foam, such as an epoxy foam, in order to insulate the plate and the rods and to keep the different parts in place. The foam can also prevent water from entering the cavity.

Figure 7A:
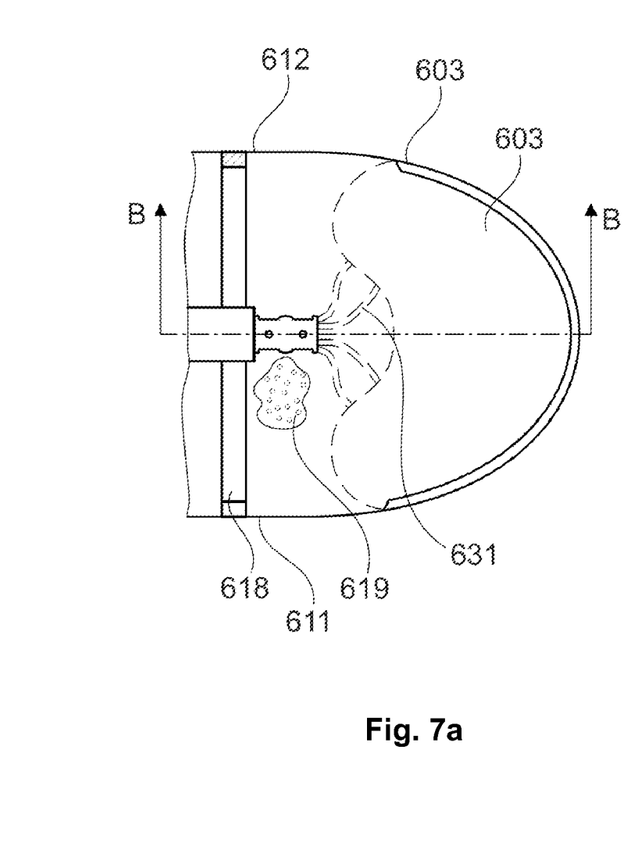
FIG. 7a is a diagrammatically longitudinal sectional view along the line A-A in FIG. 7b through the tip of a blade according to a seventh embodiment.
Figure 7B:
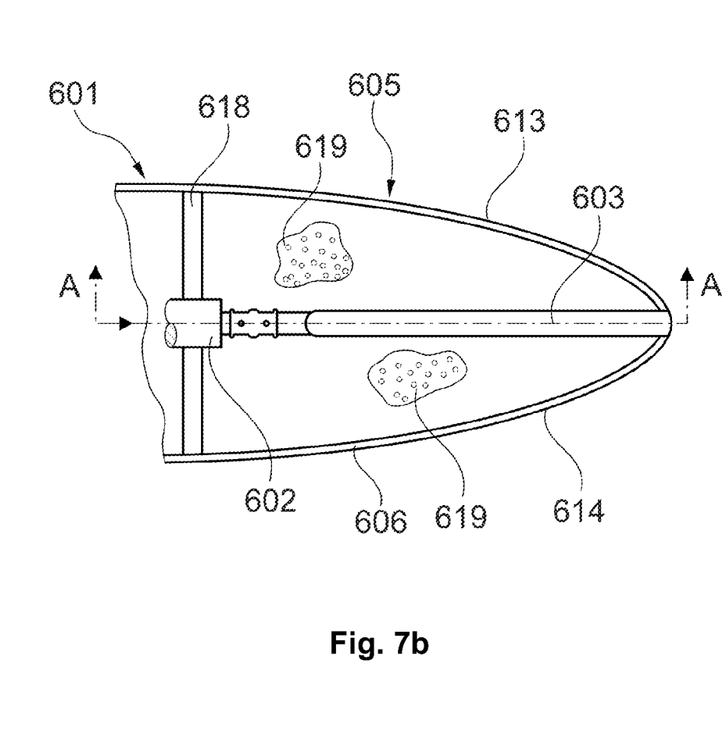
FIG. 7b is a diagrammatically longitudinal sectional view along the line B-B in FIG. 7a, FIG. 8 is a diagrammatically sectional view through the tip of a blade according to an eight embodiment.

FIG. 7 discloses a seventh embodiment of a blade according to the invention. The blade 601 comprises a laminate shell 606 formed by two mutually connected half shells. The laminate shell 606 has a suction side 613 and a pressure side 614 and a leading edge 612 and a trailing edge 611.

As described in relation to previously described embodiments a lightning protection system including a lightning conductor 602 extending substantially in the entire longitudinal direction of the blade 601 from the root and to the tip 605 of the blade 601. In the tip end, the lightning conductor extends through a bulkhead 618, preferably made of a plastic material such as a foam material and is at the distal side of the bulkhead connected to a receptor 603, being a solid plate-shaped body of graphite. Threads and or wires 631 of the conductor are at the end thereof connected to the receptor 603 extending outwardly between the connection area between the two shell parts at the tip ends thereof. The end face of the receptor is in the example shown flush with the adjacent outer surface of the tip end of the blade. However, in principle the end face of the receptor can also extend outwardly of the outer surface of the blade.

A cavity formed between the bulkhead and the apex of the blade is filled with a plastic material 619, preferably a plastic foam such as an epoxy foam, in order to insulate the plate and the rods and keep the different parts in place. The foam can also prevent water from entering the cavity.

Figure 8:
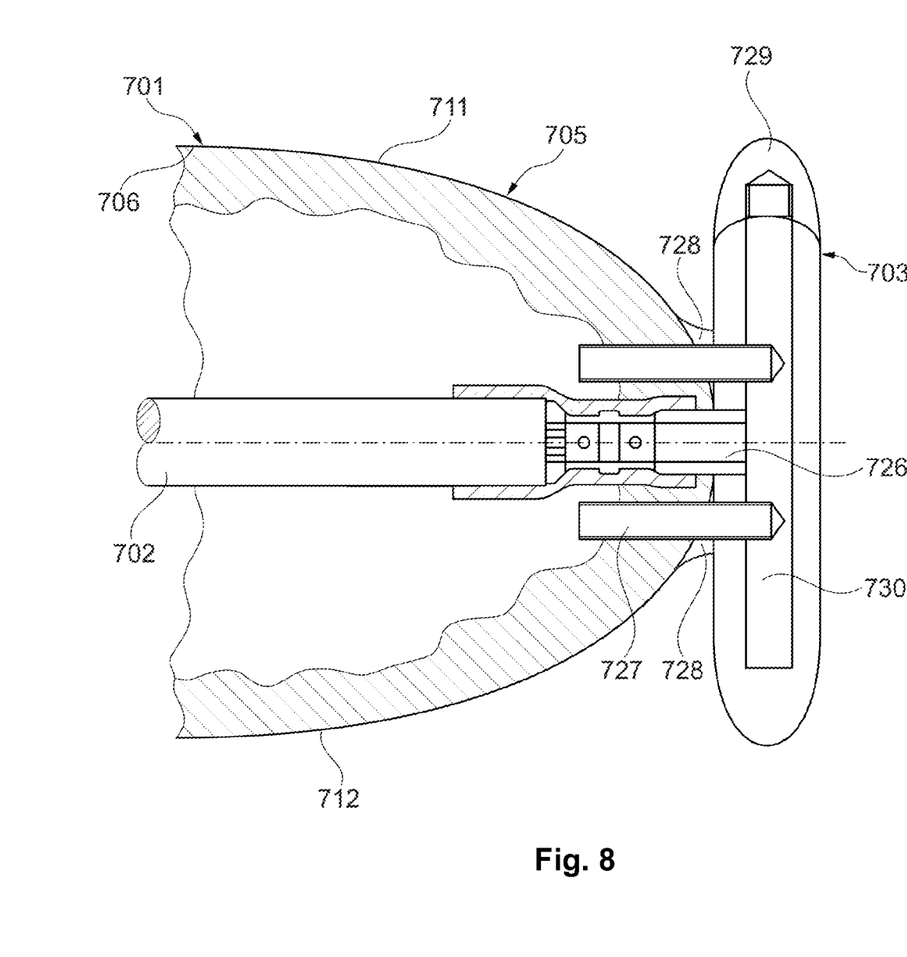

FIG. 8 discloses an eighth embodiment of a blade according to the invention. The blade 701 comprises a laminate shell 706 which can be formed by two mutually connected half shells and as described in relation to previously described embodiments a lightning protection system including a lightning conductor 702 extending substantially in the entire longitudinal direction of the blade 701 from the root and to the tip 705 of the blade. At the tip of the blade the lightning conductor is connected to a receptor 703. In the present example the receptor 703 is a rod-shaped connector arranged distally of the apex of the blade, i.e. externally of the apex, and extends longitudinally essentially parallel to the chord lines of the tip of the blade. The receptor 703 is made of graphite, with an inner rod-shaped metal core 730. From the metal core a connecting part 726 extends through the blade shell at the apex thereof to be connected to the conductor 702. Additionally, the metal core is connected to the shell of the blade by means of two bolts 727 of a not-conductive material, such as not conductive glass fiber reinforced polymer. The connection between the conductor and the connecting part 726 of the metal core is insulated by means of a shrink sleeve or shrink material 5. Further, the areas where the connecting part 726 and the bolts 727 extend between the core of the receptor and the blade are sealed by means of a sealant 728.

Finally, the opposite free ends of the receptor are rounded, and a leading free end is provided with a wear resistant layer 729, such as layer of alumina in order to protect the leading end of the receptor against excessive wear.

Items
1. A wind turbine blade being a shell body made of a composite material and having a root end and a tip end, an outer surface, a pressure side and a suction side, a trailing edge and a leading edge, and additionally a lightning protection system, the lightning protection system comprising:
    at least one lightning receptor provided with an outer surface arranged freely accessible in, on or at the outer surface of the blade at the tip end of the blade and
    a lightning conductor made of electrically conductive material extending within the shell body along substantially the entire longitudinal direction of the blade, and wherein
    the lightning receptor and the lightning conductor are electrically connected by means of a connection area
    characterized in that at least a part of the outer surface, optionally the whole of the outer surface of the receptor being freely accessible is formed of carbon such as graphite.
2. A wind turbine blade according to item 1, wherein a carbon layer is arranged on a core of an electrically conductive material such as a core of metal such as cupper or aluminum.
3. A wind turbine blade according to any of the preceding items, wherein the whole receptor is formed of carbon.
4. A wind turbine blade according to any of the preceding items, wherein in the connection area between the receptor and the conductor, the receptor is provided with a connection means configured to be releasable connected to a corresponding connection means provided at on or in the conductor in order to provide a releasable connection between the receptor and the conductor allowing for replacement of the receptor.
5. A wind turbine blade according to item 4, wherein the releasable connection between the receptor and the conductor is a thread connection comprising an inner and an outer thread, the connection means of the receptor being the inner thread and the connection means of the conductor the outer thread or vice versa.
6. A wind turbine according to any of the preceding item, wherein at least a projecting portion the lightning receptor has the form of a Franklin rod or is substantially shaped like an egg.
7. A wind turbine blade according to any of the preceding items, wherein the lightning receptor is projecting outwardly from the outer surface of the receptor and the outer surface of the receptor facing towards the rotation direction of the blade is formed by a protecting wear resistant material on the surface such as alumina in order to protect the carbon part of the receptor from being subjected to excessive wear during operation of the blade.
8. A wind turbine blade according to any of the preceding items, wherein the tip of the blade is formed as a substantially solid body of insulating material.
9. A wind turbine blade according to item 8, wherein the insulating material is a plastic material, such as PVC, fiber-reinforced polymer or polyurethane (PUR), e.g. foam PUR.
10. A wind turbine blade according to any of the preceding items, wherein at least one drain hole is arranged at or in the vicinity of the tip of the blade, and optionally, that a diverter extending substantially between the location of the drain hole and the location of the lightning receptor is positioned on the surface of the blade.
11. A wind turbine blade according to any of the preceding items, wherein the receptor extends transversely of the blade from the suction side to the pressure side, and opposite end faces of the receptor are essentially flush with the outer surface of the respective sides or extend beyond the outer surface of the receptor.
12. A wind turbine according to item 11, wherein the conductor is connected to the receptor by the conductor and/or threads and/or wires thereof being anchored in a cavity of the receptor by means of a conductive cement such as a so-called Cu powder cement.
13. A wind turbine according to items 11 and/or 12, wherein a bulkhead is sealing connected to the shell body in the tip area thereof and the receptor is arranged between the bulkhead and the apex of the tip, optionally the cavity between the bulkhead and the apex of the tip being filled with a plastic material, preferably plastic foam, such as an epoxy foam.
14. A wind turbine according to any of the preceding items 1 to 10, wherein the receptor is formed at the distal portion of the tip adjacent the apex of the tip by a plurality of carbon plies, preferably biax carbon plies and a plurality of metal mesh plies, such as Cu mesh plies, and the metal mesh/carbon plies are connected to a first metal element, such as an elongated plate or rod, by means of a number of second metal elements the inner ends thereof being connected to the first metal element and the outer end thereby extending up to the outer surface of the tip, and the first metal element being connected to the conductor.

15. A wind turbine according to item 14, wherein a bulkhead is sealingly connected to the shell body in the tip area proximally of the plies so as to form a cavity between the bulkhead and the apex of the tip, the cavity being optionally filled with a plastic material, preferably a plastic foam, such as an epoxy foam.

16. A wind turbine according to any of the preceding items 1 to 10, wherein the receptor is a plate-shaped body essentially arranged in a plane defined by the chord lines in the distal part of the tip area, the plate-shaped body being proximally connected to conductor and/or treads and/or wires thereof and distally having an outer curved edge with a shape corresponding to the outer contour of the tip adjacent the apex as seen in the plane defined by the chord lines, the outer curved edge being flush with the adjacent outer surface of the blade.

17. A wind turbine according to any of the preceding items 1 to 10, wherein the receptor is arranged externally of the outer surface of the tip of the blade at the apex thereof and is connected to the conductor by means of a connecting part extending through the shell body at the apex thereof.

18. A wind turbine according to item 17, wherein the receptor is rod-shaped and extends longitudinally essentially parallel to the chord lines of the tip of the blade.

LIST OF REFERENCES 1, 101, 201, 301, 401, 501, 601, 701 blade
2, 102, 202, 302, 402, 502, 602, 702 lightning conductor
3, 103, 203, 303, 403, 503, 603, 703 lightning receptor
3a first, accessible receptor part
3b second, non-accessible receptor part
4, 104, 204 drain hole
5 shrink sleeve or shrink material
105, 205, 305, 405, 505, 605,705 tip
6, 106, 206, 306, 406. 506, 606, 706 laminate shell
7 filter
8 diverter
108, 208, 308 glue joint
9, 109, 209 cavity
10 threaded connection
11, 611, 711 trailing edge
12, 612, 712 leading edge
13, 313, 413, 513, 613 suction side
14, 314, 414, 514, 614 pressure side
210 plastic rod
211 threaded connection
212 threaded hole
315, 316; 415, 416, 515, 516 opposite end portions
317 connection device
318,418, 518, 618 bulkhead
319,419, 519, 619 plastic material
331 first or upper section
332 second or lower section
333 shoulder
334 outer thread
335,435 cable connector
336 inner tread
337 first end of cable connector 335
338 second end of cable connector 335
339 inner tread in hole 340
340 hole
341, 441 core of the conductor
344 ring shaped element
345 plastic insulation
420 conductive cement
442 conductive threads and/or wires
443 cavity of receptor 403
521 metal plate
522 rods
523 carbon ply
524 metal mesh ply
631 threads and wires
726 connecting part
727 bolts
728 sealant
729 wear-resistant material.
730 rod shaped metal core

The invention claimed is:

1. A wind turbine blade comprising a shell body made of a composite material and having a root end and a tip end, an outer surface, a pressure side and a suction side, a trailing edge and a leading edge, and additionally a lightning protection system, the lightning protection system comprising:
at least one lightning receptor provided with an outer surface arranged freely accessible in, on or at the outer surface of the wind turbine blade at the tip end of the wind turbine blade; and
a lightning conductor made of electrically conductive material extending within the shell body along the entire longitudinal direction of the wind turbine blade,
wherein the at least one lightning receptor and the lightning conductor are electrically connected by means of a connection area,
wherein at least a part of the outer surface, optionally the whole of the outer surface of the at least one lightning receptor, is freely accessible and is formed of carbon, and
wherein the lightning conductor is provided with conductive threads and/or wires extending outwardly from the outer surface of the at least one lightning receptor and being anchored in a cavity of the at least one lightning receptor by means of a conductive material or cement, and the outwardly extending threads and/or wires are connected to the lightning conductor in the connection area.

2. The wind turbine blade according to claim 1, wherein the at least one lightning receptor comprises a graphite layer arranged on a core of an electrically conductive material.

3. The wind turbine blade according to claim 2, wherein the electrically conductive material comprises copper or aluminum.

4. The wind turbine blade according to claim 1, wherein an entirety of the at least one lightning receptor is formed of graphite.

5. The wind turbine blade according to claim 1, wherein the at least one lightning receptor has a cylindrical outer surface comprising a first upper section and a second lower section having a circular cylindric outer surface, the first upper and second lower section each having equal maximum outer diameters.

6. The wind turbine blade according to claim 1, wherein the at least one lightning receptor has a cylindrical outer surface comprising a first upper section and a second lower section having a circular cylindric outer surface, the second lower section having a smaller diameter than a diameter of the first upper section, a shoulder being provided between the first upper and the second lower sections.

7. The wind turbine blade according to claim 1, wherein the connection area between the lightning conductor and the at least one lightning receptor is insulated by an insulating material.

8. The wind turbine blade according to claim 7, wherein the insulating material comprises PUR or epoxy.

9. The wind turbine blade according to claim 1, wherein a bulkhead is sealing connected to the shell body in a tip area thereof and the at least one lightning receptor is arranged between the bulkhead and an apex of the tip, optionally a cavity between the bulkhead and the apex of the tip is filled with a plastic material.

10. The wind turbine blade according to claim 9, wherein the plastic material comprises epoxy or an epoxy foam.

11. The wind turbine blade according to claim 1, wherein the at least one lightning receptor projects outwardly from the outer surface of the blade, wherein the outer surface of the at least one lightning receptor facing towards a rotation direction of the blade is formed from a protecting, wear resistant material on the outer surface in order to protect the carbon of the at least one lightning receptor from being subjected to excessive wear during operation of the blade.

12. The wind turbine blade according to claim 11, wherein the protecting, wear resistant material comprises alumina.

13. The wind turbine blade according to claim 1, wherein at least one drain hole is arranged at or in a vicinity of the tip of the blade, and optionally, a diverter extends between a location of the at least one drain hole and a location of the at least one lightning receptor, and is positioned on the outer surface of the blade.

14. The wind turbine blade according to claim 1, wherein the carbon comprises graphite.

15. The wind turbine blade according to claim 1, wherein the conductive material or cement comprises Cu powder cement.

16. The wind turbine blade according to claim 1, wherein the at least one lightning receptor extends transversely of the wind turbine blade from the suction side to the pressure side through or into respective openings in the respective pressure and suction sides, and opposite end faces of the at least one lightning receptor are flush with outer surfaces of the respective pressure and suction sides or extend beyond the outer surface of the wind turbine blade.

* * * * *